May 27, 1947.  A. C. DURDIN, 3D  2,421,191
MECHANICAL AERATING DEVICE
Filed Feb. 2, 1944
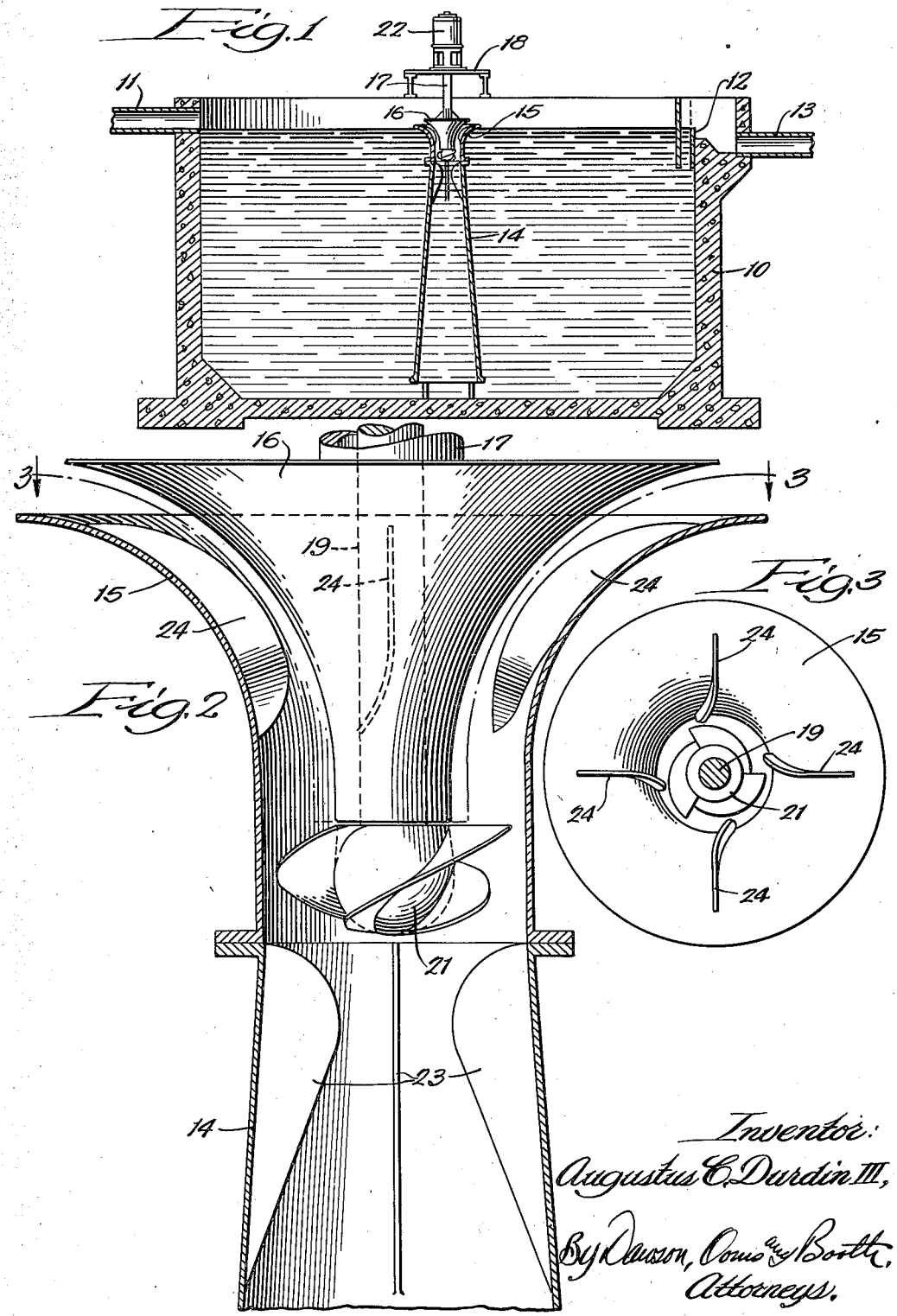
Inventor:
Augustus C. Durdin III,
By Dawson, Coins & Booth,
Attorneys.

Patented May 27, 1947

2,421,191

UNITED STATES PATENT OFFICE 2,421,191

MECHANICAL AERATING DEVICE

Augustus C. Durdin, III, Rockford, Ill., assignor of twenty-four per cent to Lewis H. Durdin, Franklin, Pa., and fifty-two per cent to Augustus C. Durdin, Jr.; The Northern Trust Company, executor of said Augustus C. Durdin, Jr., deceased Application February 2, 1944, Serial No. 520,813

1 Claim. (Cl. 259—97)

This invention relates to mechanical aerating device and more particularly to a device for circulating and aerating a liquid such as sewage.

One of the objects of the invention is to provide a mechanical aerating device which is simple and inexpensive to construct and easy to install and which will aerate a liquid effectively.

Another object of the invention is to provide a mechanical aerating device in which liquid is circulated through a draft tube by a rotating impeller and reactance vanes are provided carried by the draft tube to receive liquid from the impeller and direct it in straight line flow out the end of the tube. According to one feature of the invention, the vanes are so constructed as to be self-cleaning so that any fibrous material in the liquid will not collect thereon.

The above and other objects and advantages will be more readily apparent from the following description when read in connection with the accompanying drawing, in which—

Figure 1 is a section of a sewage aeration tank embodying the invention;

Figure 2 is an enlarged section with parts in elevation of the upper end of the draft tube; and Figure 3 is a horizontal section on the curved line 3—3 of Figure 2.

Figure 1 illustrates a typical sewage aeration tank installation in which a tank 10 is adapted to contain sewage supplied through a pipe 11. Effluent from the tank flows over a weir 12 and out an effluent conduit 13.

Sewage in the tank is circulated and aerated by means of a draft tube 14 mounted centrally in the tank with its lower end spaced above the tank bottom and with its upper end flared at 15 and terminating slightly above the liquid level in the tank. The draft tube has centrally mounted in its upper flared end a fixed reaction cone 16 shaped similarly to the flared walls of the tube and spaced therefrom to provide an annular outlet. The cone 16 is supported by a tube 17 carried by a frame work 18 above the tank and an impeller shaft 19 extends through the tube and the cone to drive a vaned impeller 21 at the lower end of the lower end of the cone. A motor 22 carried by the frame work 18 is connected to the shaft 19 to drive the impeller.

The draft tube carries a series of guide vanes 23 at the inlet side of the impeller 21 which serves to guide the sewage smoothly into the impeller without any whirling. The guide vanes as shown extend radially inward from the tube walls and taper gradually from their inlet ends to a maximum width adjacent their outlet ends such as to provide an unobstructed central passage in the tube aligned with the impeller axis. With this construction any solid material carried by the sewage will slide over the edges of the guide vanes and will not collect thereon so that the guide vanes are self-cleaning and may operate indefinitely without attention. The construction as so far described is substantially similar to that disclosed and claimed in my Patent No. 2,346,366, April 11, 1944.

According to the present invention a series of reaction vanes 24 are provided carried by the flared end of the tube and extending inwardly therefrom toward the cone 16. The reaction vanes taper gradually from a minimum width adjacent their inlet ends to a maximum width intermediate their ends which is such as to leave a free space between the inner edges of the vanes and the cone. With this construction, solid material carried by the sewage will tend to slide over the edges of the reaction vanes between the vanes and the cone and will not collect on the vanes to clog the flow passage.

The apparatus as described above is extremely simple to install and operate since all parts except the cone and impeller are carried by the tube itself. Thus, with the tube installed in the tank, the reaction cone and impeller assembly may simply be inserted in the tube from above and the apparatus is ready to operate. It will be noted that in this connection that the reaction vanes are so shaped as best seen in Figure 3 that the impeller may be inserted from the top without interfering with these vanes.

Another advantage of the present construction is that the cone 16 may be omitted entirely and the apparatus will still operate effectively. In operation, the impeller 21 sets up a whirl in the liquid tending to throw it out against the sides of the tube so that liquid leaving the impeller will flow into the reaction vanes 24 and will tend to spread along the flared tube walls 15. Even after whirling of the liquid is removed by operation of the reaction vanes, the skin friction of the liquid against the tube and vanes will hold it close to the flaring walls of the tube so that it will be discharged in an annular stream over the upper edges of the tube without the necessity of using the cone.

While one embodiment of the invention has been shown and described in detail, it will be understood that this is illustrative only and is not to be taken as a definition of the scope of

What is claimed is:

A mechanical aerator comprising a tube for fluid flow flared at its outlet end, a reaction cone mounted in the flared outlet end and spaced from the walls thereof, an impeller adjacent the inner end of the cone to cause circulation of fluid through the tube, a series of guide vanes at the inlet side of the impeller secured to the tube and tapering in width from their inlet ends to a maximum such as to leave a central free space in the tube aligned with the impeller, and a series of reactance vanes on the flared end of the tube to receive fluid from the impeller and direct it out the end of the tube, the reactance vanes being supported solely by the tube and having their inner edges spaced from the cone.

AUGUSTUS C. DURDIN, III.

REFERENCES CITED

The following references are of record in the file of this patent:

UNITED STATES PATENTS

| Number | Name | Date |
|---|---|---|
| 1,255,944 | Stevens | Feb. 12, 1918 |
| 2,346,366 | Durdin 3rd | Apr. 11, 1944 |
| 1,795,588 | Wilson | Mar. 10, 1931 |
| 2,067,161 | Durdin, Jr. | Jan. 5, 1937 |
| 2,293,183 | Walker | Aug. 18, 1942 |
| 619,739 | Emery | Feb. 21, 1899 |